US012568022B2

(12) United States Patent
Wu et al.

(10) Patent No.: US 12,568,022 B2
(45) Date of Patent: Mar. 3, 2026

(54) METHOD AND APPARATUS FOR ADJUSTING RUNNING STATUS OF NETWORK DEVICE AND RELATED DEVICE

(71) Applicant: HUAWEI TECHNOLOGIES CO., LTD., Shenzhen (CN)

(72) Inventors: Jun Wu, Nanjing (CN); Jie Zhang, Beijing (CN); Liang Zhang, Nanjing (CN); Xiaodong Xu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 24 days.

(21) Appl. No.: 18/808,246

(22) Filed: Aug. 19, 2024

(65) Prior Publication Data

US 2024/0414060 A1 Dec. 12, 2024

Related U.S. Application Data

(63) Continuation of application No. PCT/CN2023/077060, filed on Feb. 20, 2023.

(30) Foreign Application Priority Data

Feb. 21, 2022 (CN) .......................... 202210159692.9

(51) Int. Cl.
  *H04L 41/0894* (2022.01)
  *H04L 41/0833* (2022.01)
(52) U.S. Cl.
  CPC ...... *H04L 41/0894* (2022.05); *H04L 41/0833* (2013.01)
(58) Field of Classification Search
  None
  See application file for complete search history.

(56) References Cited

U.S. PATENT DOCUMENTS

| 9,467,918 B1 | 10/2016 | Kwan | |
| 12,445,869 B2 * | 10/2025 | Mitra | ..................... H04W 24/02 |

(Continued)

FOREIGN PATENT DOCUMENTS

| CN | 101110701 A | 1/2008 |
| CN | 101598967 A | 12/2009 |

(Continued)

OTHER PUBLICATIONS

Miyuru Dayarathna et al, "Data Center Energy Consumption Modeling: A Survey", IEEE Communications Surveys and Tutorials, vol. 18, No. 1, First Quarter 2016, total 63 pages, XP011597195.

*Primary Examiner* — Quang N Nguyen
(74) *Attorney, Agent, or Firm* — WOMBLE BOND DICKINSON (US) LLP

(57) ABSTRACT

A method and an apparatus for adjusting a running status of a network device and a related device are disclosed. A second network device sends, to a first network device, first traffic information of traffic processed by the second network device in a first time period. The first network device predicts, based on the first traffic information, second traffic information corresponding to the second network device in a second time period. The first network device determines, based on the second traffic information, energy consumption corresponding to each energy saving policy, and determines, as a target energy saving policy, an energy saving policy corresponding to energy consumption that meets a preset condition. The first network device sends the target energy saving policy to the second network device, to enable the second network device to be run based on a configuration parameter in the target energy saving policy.

20 Claims, 5 Drawing Sheets

(56) References Cited

U.S. PATENT DOCUMENTS

2015/0341245 A1* 11/2015 Merlo ................. H04L 43/0876
                                                     709/224
2023/0199560 A1*  6/2023 Nuggehalli ....... H04W 28/0917
                                                     455/450
2023/0209467 A1*  6/2023 Geng ................... H04W 24/02
                                                     370/318
2024/0244522 A1*  7/2024 Huang ................. H04W 52/02

FOREIGN PATENT DOCUMENTS

CN        103428282  A     12/2013
CN        107276788  A     10/2017
CN        111065114  A      4/2020
WO       2017148253  A1     9/2017

* cited by examiner

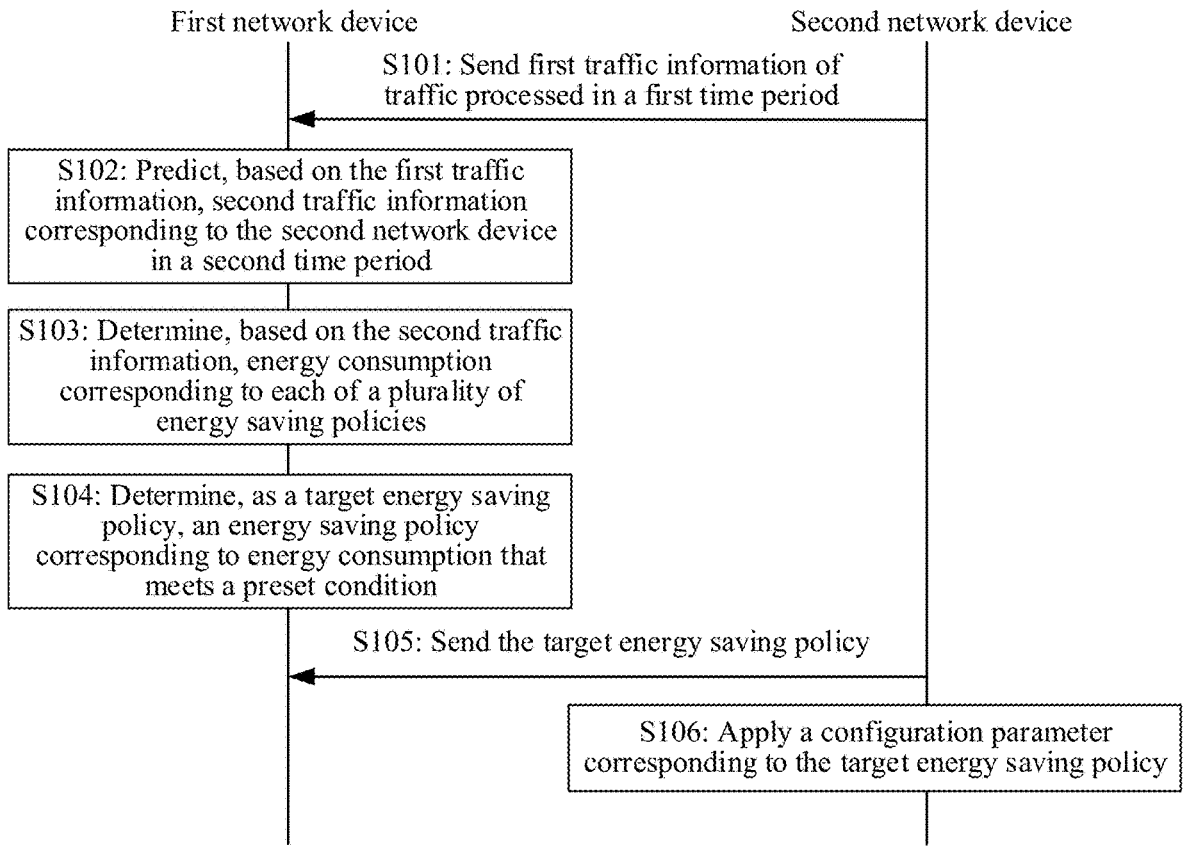

First network device                                    Second network device

S101: Send first traffic information of
traffic processed in a first time period S102: Predict, based on the first traffic
information, second traffic information
corresponding to the second network device
in a second time period S103: Determine, based on the second traffic
information, energy consumption
corresponding to each of a plurality of
energy saving policies S104: Determine, as a target energy saving
policy, an energy saving policy
corresponding to energy consumption that
meets a preset condition S105: Send the target energy saving policy S106: Apply a configuration parameter
corresponding to the target energy saving policy

METHOD AND APPARATUS FOR ADJUSTING RUNNING STATUS OF NETWORK DEVICE AND RELATED DEVICE

CROSS-REFERENCE TO RELATED APPLICATIONS

This application is a continuation of International Application No. PCT/CN2023/077060, filed on Feb. 20, 2023, which claims priority to Chinese Patent Application No. 202210159692.9, filed on Feb. 21, 2022. The disclosures of the aforementioned applications are hereby incorporated by reference in their entireties.

TECHNICAL FIELD

This application relates to the field of communication technologies, and in particular, to a method and an apparatus for adjusting a running status of a network device and a related device.

BACKGROUND

With the continuous development of network technologies, demand of people for network services increases sharply, so that a quantity and a scale that are of network devices that provide the network services also increase rapidly. Expansion of the network scale causes an increase in network energy consumption. This not only increases network operation costs, but also generates a lot of carbon emissions.

SUMMARY

This application provides a method and an apparatus for adjusting a running status of a network device and a related device, to reduce energy consumption of the network device by adjusting a running parameter of the network device.

According to a first aspect, this application provides a method for adjusting a running status of a network device. A first network device receives first traffic information sent by a second network device. The first traffic information indicates a value of traffic processed by the second network device in a first time period. The first network device predicts, based on the first traffic information, second traffic information corresponding to the second network device in a second time period. The second time period is later than the first time period. The first network device determines, based on the second traffic information, an energy consumption value corresponding to each of a plurality of energy saving policies. Each energy saving policy includes a configuration parameter corresponding to a component in the second network device. The first network device determines, as a target energy saving policy, an energy saving policy corresponding to an energy consumption value that meets a preset condition, and sends the target energy saving policy to the second network device, to enable the second network device to be run based on a configuration parameter in the target energy saving policy.

The first network device determines, by predicting the second traffic information of traffic that needs to be processed by the second network device in the second time period, the target energy saving policy that matches the traffic information, and sends the target energy saving policy to the second network device, so that the second network device configures a parameter of an internal component based on the target energy saving policy that matches the to-be-processed traffic. Therefore, in this solution, the second network device consumes low energy in a low-traffic time period, and energy consumption of the network device is reduced.

The preset condition includes that the energy consumption value corresponding to the target energy saving policy is a smallest value of a plurality of energy consumption values corresponding to the plurality of energy saving policies, or the energy consumption value corresponding to the target energy saving policy is less than or equal to an energy consumption threshold.

In an embodiment, the first network device may further determine, based on the second traffic information and the target energy saving policy, a planned execution time period corresponding to the target energy saving policy, and send the planned execution time period to the second network device, to enable the second network device to execute the target energy saving policy in a time period corresponding to the planned execution time period.

In an embodiment, the first network device may further determine a wakeup value based on the target energy saving policy. The wakeup value indicates a condition under which the second network device stops executing the target energy saving policy. The wakeup value may include a traffic threshold and/or a performance threshold. When the wakeup value includes the traffic threshold and traffic processed by the second network device exceeds the traffic threshold, execution of the target energy saving policy is stopped. When the wakeup value includes the performance threshold and a traffic processing performance value of the second network device exceeds the performance threshold, the execution of the target energy saving policy is stopped. The traffic threshold may include a throughput threshold, and the performance threshold may include a delay threshold, a jitter threshold, a packet loss rate threshold, and the like.

In an embodiment, the first network device may predict, by using a traffic prediction model, traffic information corresponding to the first network device in the second time period. Specifically, the first network device inputs the first traffic information into the traffic prediction model, to obtain the second traffic information output by the traffic prediction model. The traffic prediction model is generated through training based on historical traffic information of the second network device.

In an embodiment, the first network device may determine, by using an energy consumption prediction model, energy consumption corresponding to each energy saving policy. Specifically, for each energy saving policy, the first network device inputs, into the energy consumption prediction model, the second traffic information and a configuration parameter corresponding to the energy saving policy, to obtain energy consumption that is output by the energy consumption prediction model and that corresponds to the energy saving policy. The energy consumption prediction model is generated based on training samples. Each training sample includes traffic information, an energy consumption value, and a configuration parameter corresponding to the energy consumption value.

The energy consumption prediction model corresponds to a device type. Before determining, by using the energy consumption prediction model, the energy consumption corresponding to the energy saving policy, the first network device may determine, based on the device type of the second network device, the energy consumption prediction model corresponding to the device type. That device types are the same means, for example, models of network devices are the same.

In an embodiment, when the second network device is run based on the target energy saving policy, an abnormal case may occur, which causes the second network device to stop executing the target energy saving policy in advance. In this case, the first network device may further receive an actual execution time period that is of the target energy saving policy and that is sent by the second network device. The first network device updates the target energy saving policy based on the actual execution time period. Execution duration corresponding to the actual execution time period is less than execution duration corresponding to the planned execution time period.

In an embodiment, the first network device may further receive third traffic information sent by the second network device. A statistical value corresponding to the third traffic information exceeds the wakeup value. The first network device optimizes the traffic prediction model based on the third traffic information. To be specific, when the statistical value exceeds the wakeup value due to occurrence of burst traffic information, the second network device may send the burst traffic information to the first network device, so that the first network device optimizes the traffic prediction model based on the burst traffic information, to improve accuracy of the traffic prediction model.

In an embodiment, the first network device sends a local training sample to a third network device, and receives an energy consumption prediction model sent by the third network device. The local training sample includes historical traffic information, a historical energy consumption value, and a configuration parameter corresponding to the historical energy consumption value that are of a network device managed by the first network device. The energy consumption prediction model is generated by the third network device through training using the local training sample. For example, the first network device is a controller, and the third network device is a cloud device.

In an embodiment, the first network device generates a first energy consumption prediction model by using a local training sample, sends a model parameter of the first energy consumption prediction model to a third network device, and receives an energy consumption prediction model sent by the third network device. The energy consumption prediction model is determined by the third network device based on model parameters that are of first energy consumption prediction models and that are respectively sent by a plurality of first network devices. The local training sample includes historical traffic information, a historical energy consumption value, and a configuration parameter corresponding to the historical energy consumption value that are of a network device managed by the first network device. In this implementation, each first network device first performs preliminary training by using the local training sample, to obtain the model parameter of the first energy consumption prediction model, and sends the obtained model parameter to the third network device. The third network device determines, by using the model parameters sent by the plurality of first network devices, a final model parameter corresponding to the energy consumption prediction model, so that not only training efficiency is improved, but also accuracy of the energy consumption prediction model is improved.

According to a second aspect, this application provides a method for adjusting a running status of a network device. A second network device sends first traffic information to a first network device. The first traffic information indicates a value of traffic processed by the second network device in a first time period. The second network device receives a target energy saving policy sent by the first network device, and applies a configuration parameter corresponding to the target energy saving policy. The target energy saving policy is determined by the first network device based on second traffic information. The second traffic information is traffic that corresponds to the second network device in a second time period and that is predicted by the first network device based on the first traffic information. The second time period is later than the first time period. The target energy saving policy includes the configuration parameter corresponding to a component in the second network device, and energy consumption corresponding to the target energy saving policy meets a preset condition. The preset condition includes that an energy consumption value corresponding to the target energy saving policy is a smallest value of a plurality of energy consumption values corresponding to a plurality of energy saving policies, or the energy consumption value corresponding to the target energy saving policy is less than or equal to an energy consumption threshold.

In an embodiment, the second network device may further receive a planned execution time period sent by the first network device. The planned execution time period indicates that an execution time period of the target energy saving policy, and the planned execution time period is determined by the first network device based on the second traffic information and the target energy saving policy.

In an embodiment, the second network device may further receive a wakeup value sent by the first network device. The wakeup value indicates a condition under which the second network device stops executing the target energy saving policy. The wakeup value is determined by the first network device based on the target energy saving policy.

In an embodiment, the second network device stops executing the target energy saving policy when the second network device executes the target energy saving policy and a statistical value of the second network device exceeds the wakeup value. In this implementation, when the statistical value of the second network device exceeds the wakeup value, this indicates that traffic currently processed by the second network device does not match the predicted second traffic information, and burst traffic occurs. To better process the burst traffic, the second network device may stop executing the target energy saving policy in advance.

In an embodiment, when executing the target energy saving policy, the second network device may collect statistics on a transmission performance value corresponding to the second network device. The second network device stops executing the target energy saving policy when the transmission performance value is greater than a transmission performance threshold.

In an embodiment, the second network device sends an actual execution time period of the target energy saving policy to the first network device, so that the first network device can learn that the second network device stops executing the target energy saving policy in advance. Execution duration corresponding to the actual execution time period is less than execution duration corresponding to the planned execution time period.

In an embodiment, the second network device may further send third traffic information to the first network device, so that the first network device optimizes a traffic prediction model by using the third traffic information, to improve prediction accuracy of the traffic prediction model. The third traffic information indicates traffic, that is, the burst traffic, that triggers stop of the target energy saving policy.

According to a third aspect, this application provides a network system. The system includes a first network device and a second network device. The first network device is configured to perform the method according to any one of the first aspect or the possible implementations of the first aspect. The second network device is configured to perform the method according to any one of the second aspect or the possible implementations of the second aspect.

In an embodiment, the network system further includes a third network device. The third network device is configured to receive a local training sample sent by the first network device, generate an energy consumption prediction model through training based on the local training sample, and send the energy consumption prediction model to the first network device. The local training sample includes historical traffic information, a historical energy consumption value, and a configuration parameter corresponding to the historical energy consumption value that are of a network device managed by the first network device.

According to a fourth aspect, this application provides an apparatus for adjusting a running status of a network device. The apparatus is applied to a first network device, and includes a receiving unit, a prediction unit, a determining unit, and a sending unit. The receiving unit is configured to receive first traffic information sent by a second network device. The first traffic information indicates a value of traffic processed by the second network device in a first time period. The prediction unit is configured to predict, based on the first traffic information, second traffic information corresponding to the second network device in a second time period. The second time period is later than the first time period. The determining unit is configured to determine, based on the second traffic information, an energy consumption value corresponding to each of a plurality of energy saving policies. Each energy saving policy includes a configuration parameter corresponding to a component in the second network device when the component in the second network device is run based on the energy saving policy. The determining unit is further configured to determine, as a target energy saving policy, an energy saving policy corresponding to an energy consumption value that meets a preset condition. The sending unit is configured to send the target energy saving policy to the second network device, to enable the second network device to be run based on a configuration parameter in the target energy saving policy.

In an embodiment, the determining unit is further configured to determine, based on the second traffic information and the target energy saving policy, a planned execution time period corresponding to the target energy saving policy. The sending unit is further configured to send the planned execution time period to the second network device, to enable the second network device to execute the target energy saving policy in a time period corresponding to the planned execution time period.

In an embodiment, the determining unit is further configured to determine a wakeup value based on the target energy saving policy. The wakeup value indicates a condition under which the second network device stops executing the target energy saving policy. The sending unit is further configured to send the wakeup value to the second network device.

In an embodiment, the prediction unit is configured to input the first traffic information into a traffic prediction model, to obtain the second traffic information output by the traffic prediction model. The traffic prediction model is generated through training based on historical traffic information of the second network device.

In an embodiment, the determining unit is configured to, for each energy saving policy, input, into an energy consumption prediction model, the second traffic information and a configuration parameter corresponding to the energy saving policy, to obtain energy consumption that is output by the energy consumption prediction model and that corresponds to the energy saving policy. The energy consumption prediction model is generated based on training samples. Each training sample includes traffic information, an energy consumption value, and a configuration parameter corresponding to the energy consumption value.

In an embodiment, the determining unit is further configured to: before inputting, into the energy consumption prediction model, the second traffic information and the configuration parameter corresponding to the energy saving policy, determine the energy consumption prediction model based on a device type of the second network device. The device type corresponds to the energy consumption prediction model.

In an embodiment, the apparatus further includes an update unit. The receiving unit is further configured to receive an actual execution time period that is of the target energy saving policy and that is sent by the second network device. The update unit is configured to update the target the energy saving policy based on the actual execution time period. Execution duration corresponding to the actual execution time period is less than execution duration corresponding to the planned execution time period.

In an embodiment, the apparatus further includes an optimization unit. The receiving unit is further configured to receive third traffic information sent by the second network device. The optimization unit is configured to optimize the traffic prediction model based on the third traffic information. A statistical value corresponding to the third traffic information exceeds the wakeup value.

In an embodiment, the sending unit is further configured to send a local training sample to a third network device. The receiving unit is further configured to receive an energy consumption prediction model sent by the third network device. The energy consumption prediction model is generated by the third network device through training using the local training sample. The local training sample includes historical traffic information, a historical energy consumption value, and a configuration parameter corresponding to the historical energy consumption value that are of a network device managed by the first network device.

In an embodiment, the apparatus further includes a generation unit. The generation unit is configured to generate a first energy consumption prediction model by using a local training sample. The sending unit is further configured to send a model parameter of the first energy consumption prediction model to a third network device. The receiving unit is further configured to receive an energy consumption prediction model sent by the third network device. The energy consumption prediction model is determined by the third network device based on model parameters that are of first energy consumption prediction models and that are respectively sent by a plurality of first network devices. The local training sample includes historical traffic information, a historical energy consumption value, and a configuration parameter corresponding to the historical energy consumption value that are of a network device managed by the first network device.

In an embodiment, the preset condition includes that the energy consumption value corresponding to the target energy saving policy is a smallest value of a plurality of energy consumption values corresponding to the plurality of energy saving policies, or the energy consumption value corresponding to the target energy saving policy is less than or equal to an energy consumption threshold.

According to a fifth aspect, this application provides an apparatus for adjusting a running status of a network device. The apparatus is applied to a second network device. The apparatus includes a sending unit, a receiving unit, and an applying unit. The sending unit is configured to send first traffic information to a first network device. The first traffic information indicates a value of traffic processed by the second network device in a first time period. The receiving unit is configured to receive a target energy saving policy sent by the first network device. The target energy saving policy is determined by the first network device based on second traffic information. The second traffic information is traffic that corresponds to the second network device in a second time period and that is predicted by the first network device based on the first traffic information. The second time period is later than the first time period. The target energy saving policy includes a configuration parameter corresponding to a component in the second network device when the component in the second network device is run based on the target energy saving policy. Energy consumption corresponding to the target energy saving policy meets a preset condition. The applying unit is configured to apply the configuration parameter corresponding to the target energy saving policy.

In an embodiment, the receiving unit is further configured to receive a planned execution time period sent by the first network device. The planned execution time period indicates an execution time period of the target energy saving policy. The planned execution time period is determined by the first network device based on the second traffic information and the target energy saving policy.

In an embodiment, the receiving unit is further configured to receive a wakeup value sent by the first network device. The wakeup value indicates a condition under which the second network device stops executing the target energy saving policy. The wakeup value is determined by the first network device based on the target energy saving policy.

In an embodiment, the apparatus further includes a stopping unit. The stopping unit is configured to stop executing the target energy saving policy when the second network device executes the target energy saving policy and a statistical value of the second network device exceeds the wakeup value.

In an embodiment, the apparatus further includes a determining unit. The determining unit is configured to determine a transmission performance value of the second network device when the second network device executes the target energy saving policy. The stopping unit is configured to stop executing the target energy saving policy when the transmission performance value is greater than a transmission performance threshold.

In an embodiment, the sending unit is further configured to send an actual execution time period of the target energy saving policy to the first network device. Execution duration corresponding to the actual execution time period is less than execution duration corresponding to the planned execution time period.

In an embodiment, the sending unit is further configured to send third traffic information to the first network device. The third traffic information indicates traffic that triggers stop of the target energy saving policy.

According to a sixth aspect, this application provides a network device. The network device includes a processor and a memory. The memory is configured to store instructions or a computer program. The processor is configured to execute the instructions or the computer program in the memory, to enable the network device to perform the method for adjusting a running status of a network device according to any one of the first aspect or the possible implementations of the first aspect, or perform the method for adjusting a running status of a network device according to any one of the second aspect or the possible implementations of the second aspect.

According to a seventh aspect, this application provides a computer-readable storage medium. The storage medium includes instructions. When the instructions are run on a computer, the computer is enabled to perform the method for adjusting a running status of a network device according to any one of the first aspect or the possible implementations of the first aspect, or perform the method for adjusting a running status of a network device according to any one of the second aspect or the possible implementations of the second aspect.

According to an eighth aspect, this application provides a computer program product. The computer program product includes a program or code. When the program or the code is run on a computer, the computer is enabled to implement the method for adjusting a running status of a network device according to any one of the first aspect or the possible implementations of the first aspect, or implement the method for adjusting a running status of a network device according to any one of the second aspect or the possible implementations of the second aspect.

According to technical solutions provided in this application, a second network device may send, to a first network device, traffic information, that is, first traffic information of traffic processed by the second network device in a first time period. After receiving the first traffic information, the first network device predicts, based on the first traffic information, second traffic information corresponding to the second network device in a second time period. The second time period is later than the first time period. After predicting the second traffic information, the first network device determines, based on the second traffic information, energy consumption corresponding to each of a plurality of energy saving policies. Each energy saving policy includes a configuration parameter corresponding to a component in the second network device when the component in the second network device is run based on the energy saving policy. After determining the energy consumption corresponding to each energy saving policy, the first network device determines, as a target energy saving policy, an energy saving policy corresponding to energy consumption that meets a preset condition, and sends the target energy saving policy to the second network device, to enable the second network device to be run based on a configuration parameter in the target energy saving policy. To be specific, the first network device determines, by predicting the second traffic information of traffic that needs to be processed by the second network device in the second time period, the target energy saving policy that matches the traffic information, and sends the target energy saving policy to the second network device, so that the second network device configures a parameter of an internal component based on the target energy saving policy that matches the to-be-processed traffic. Therefore, in this solution, the second network device consumes low energy in a low-traffic time period, and energy consumption is reduced.

BRIEF DESCRIPTION OF DRAWINGS

FIG. 1 is a flowchart of a method for adjusting a running status of a network device according to an embodiment of this application;

DESCRIPTION OF EMBODIMENTS

Figure 2:
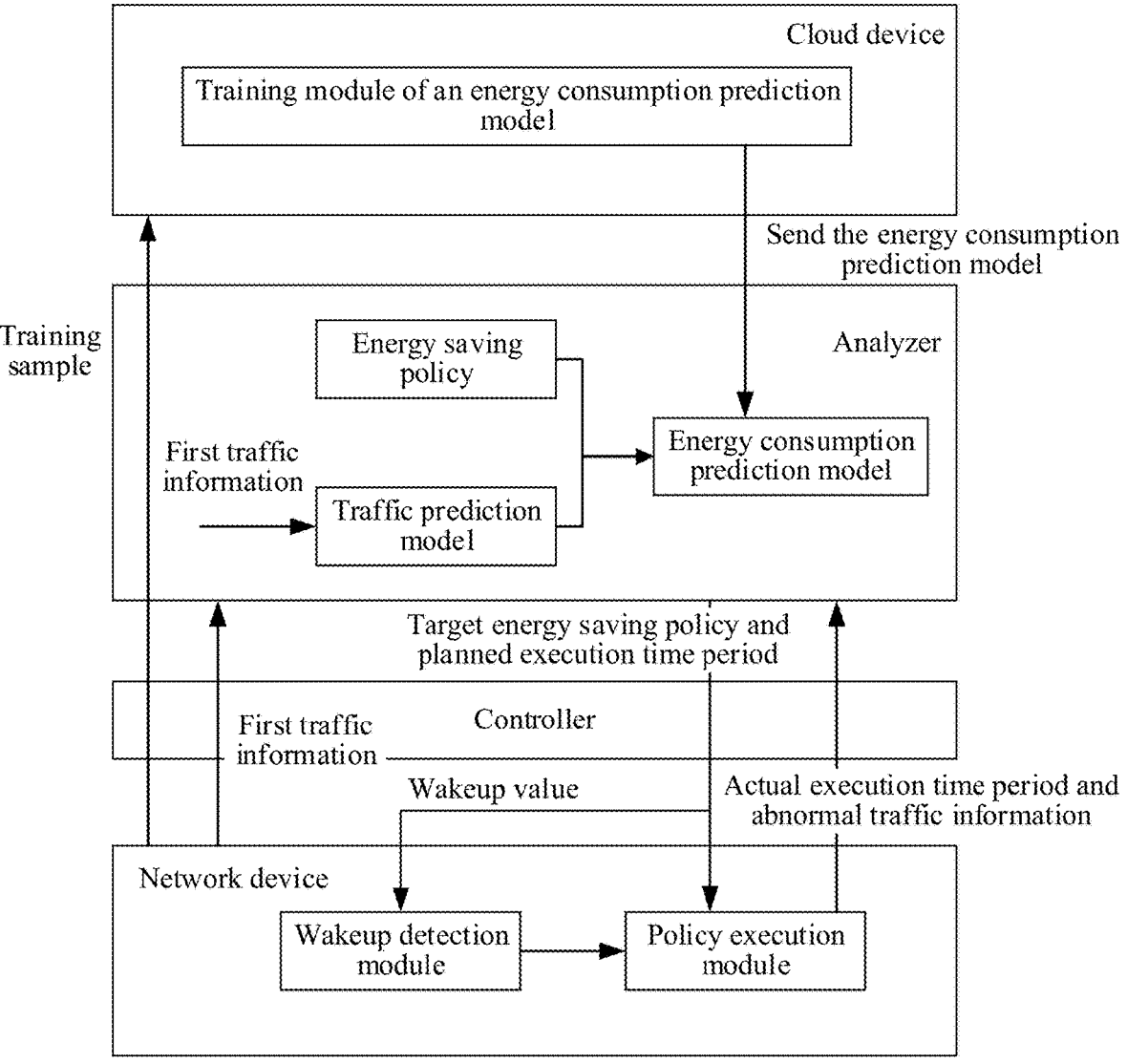
FIG. 2 is a schematic diagram of an application scenario according to an embodiment of this application.

To make a person skilled in the art understand technical solutions in this application better, the following clearly describes the technical solutions in embodiments of this application with reference to accompanying drawings in embodiments of this application. Apparently, the described embodiments are merely some but not all of embodiments of this application.

With the continuous expansion of a network construction scale, an increase in operation costs caused by network energy consumption has become a difficult problem for operators. Energy consumption of a network device is related to configuration parameters of components in the network device. However, a configuration parameter of the network device is usually in a high configuration status. This causes the network device to continuously consume high energy.

On this basis, this application provides a method for adjusting a running status of a network device, to select, from a plurality of energy saving policies, an energy saving policy that matches to-be-processed traffic of the network device; and send the matched energy saving policy to the network device, to enable the network device to be run based on a configuration parameter in the energy saving policy. The network device is run based on the configuration parameter that matches the to-be-processed traffic, so that the network device not only can normally process high traffic, but also can reduce energy consumption when the traffic decreases.

For ease of understanding the technical solutions provided in embodiments of this application, the following is described with reference to the accompanying drawings.

FIG. 1 is a flowchart of a method for adjusting a running status of a network device according to an embodiment of this application. As shown in FIG. 1, the method includes the following operations.

Operation S101: A second network device sends first traffic information to a first network device.

In this embodiment, the second network device may collect the traffic information, that is, the first traffic information of traffic processed by the second network device in a first time period, and send the first traffic information to the first network device. The first traffic information indicates a value of the traffic processed by the second network device in the first time period. Specifically, the first traffic information may include a sending rate and/or a receiving rate that are/is of the second network device in the first time period, an amount of data received and/or sent by the second network device in the first time period, or the like. The sending rate may be a rate statistical value such as an average sending rate or a maximum sending rate. The amount of data may be a quantity of bits, a quantity of bytes, a quantity of packets, or the like.

During specific implementation, the first traffic information sent by the second network device may be device-level traffic information, board-level traffic information, or interface-level traffic information. For example, when the first traffic information includes traffic information of a specific interface of the second network device, the first network device may specifically adjust a parameter of the interface based on the traffic information of the interface, so that the parameter of the interface can be adjusted more accurately.

Operation S102: The first network device receives the first traffic information sent by the second network device, and predicts, based on the first traffic information, second traffic information corresponding to the second network device in a second time period.

After receiving the first traffic information sent by the second network device, the first network device predicts, based on the first traffic information, the second traffic information corresponding to the second network device in the second time period. The second time period is later than the first time period. That is, the first network device may predict a future traffic trend based on traffic information in a historical time period. Specifically, the first network device may input the first traffic information into a traffic prediction model, to obtain the second traffic information output by the traffic prediction model. The traffic prediction model may be a preset model. For example, the first network device receives one traffic prediction model. The received traffic prediction model may be trained by another network device, or may be configured by an administrator. Alternatively, the traffic prediction model may be generated by the first network device through pre-training based on historical traffic information of the second network device. When traffic prediction needs to be performed, the first network device inputs the first traffic information into the traffic prediction model, to obtain the second traffic information by using the traffic prediction model. The historical traffic information indicates traffic values of traffic processed by the second network device in different time periods in a historical time period.

The traffic prediction model may be a regression prediction model, a neural network model, or the like. When the traffic prediction model is the neural network model, the first network device uses the obtained historical traffic information as a training sample, and each training sample includes M traffic sequences and N traffic sequences. Each traffic sequence includes one or more traffic values and time points corresponding to the one or more traffic values. A time period corresponding to the N traffic sequences is later than a time period corresponding to the M traffic sequences. The N traffic sequences are labels. In a process of each round of iterative training, the first network device may input one training sample into the neural network model, and the neural network model outputs an inference result (a predicted traffic sequence/value) for the M traffic sequences in the training sample. Then, the first network device may calculate, based on a corresponding loss function, a loss value between the inference result output by the neural network model and an actual result (label) of a group of training samples. Then, the first network device may calculate a change gradient of a parameter at each network layer in the neural network model based on the calculated loss value. In this way, the first network device may calculate an adjustment value (which may also be referred to as a parameter update amount) of the parameter in the process of the round of iterative training based on a hyperparameter preset in an optimizer and the change gradient of the parameter at each network layer. The adjustment value may be, for example, a product of the change gradient and the hyperparameter (for example, a learning rate), so that the first network device can update a parameter value of the parameter based on a calculated adjustment value of each parameter. After a plurality of times of the foregoing training, when the loss value is less than a preset threshold, the training is stopped, and the traffic prediction model is obtained.

Operation S103: The first network device determines, based on the second traffic information, energy consumption corresponding to each of the plurality of energy saving policies.

When the first network device predicts that the traffic that may be processed by the second network device in the second time period is the second traffic information, the first network device determines, based on the second traffic information, the energy consumption corresponding to each of the plurality of energy saving policies. Each energy saving policy includes a configuration parameter corresponding to a component in the second network device when the component in the second network device is run based on the energy saving policy. For example, the energy saving policy includes but is not limited to various configuration parameters such as a switch status of a central processing unit (CPU) core, a core frequency, a switch status of a port/switch board, and a sleep status of a port/switch board.

The plurality of energy saving policies are preconfigured, and some or all of configuration parameters included in each of the plurality of energy saving policies vary. Specifically, the plurality of energy saving policies may be a group of energy saving policies selected from a set of preconfigured energy saving policies.

The first network device may determine the energy consumption corresponding to each energy saving policy in the following manner, which specifically includes: For each energy saving policy, the first network device inputs the second traffic information and the energy saving policy into an energy consumption prediction model, to obtain energy consumption that is output by the energy consumption prediction model and that corresponds to the energy saving policy. The energy consumption prediction model is generated based on training samples, and each training sample includes traffic information, an energy consumption value, and a configuration parameter corresponding to the energy consumption value. To be specific, the first network device may determine, by using the energy consumption prediction model generated through pre-training, the energy consumption corresponding to each energy saving policy. The training sample may be from the first network device, or may be from another network device. A device type of the another network device is the same as a device type of the first network device. For example, a model of the another network device is the same as a model of the first network device. One training sample includes traffic information of traffic processed by the network device in a historical time period, an energy consumption value corresponding to the historical time period, and a configuration parameter corresponding to the historical time period.

Training of the energy consumption prediction model may be implemented in the following manners.

In one manner, the first network device obtains a local training sample, and trains the energy consumption prediction model by using the local training sample. The local training sample is a training sample provided by one or more network devices managed by the first network device. Specifically, the local training sample includes a training sample provided by one or more network devices managed by the first network device. The plurality of network devices have a same or similar device type. For example, the plurality of network devices have a same model. Network devices of a same device type correspond to one energy consumption prediction model, and network devices of different device types correspond to different energy consumption prediction models. One training sample includes traffic information of traffic processed by one network device in one historical time period, an energy consumption value corresponding to the historical time period, and a configuration parameter corresponding to the historical time period. To be specific, in this implementation, the first network device may complete training of the energy consumption prediction model based on the obtained local training sample. The one or more network devices managed by the first network device may include the second network device, in other words, the local training sample may include historical traffic information, a historical energy consumption value, and a configuration parameter corresponding to the historical energy consumption value that are of the second network device.

In one manner, after obtaining the local training sample, the first network device sends the local training sample to a third network device, so that the third network device trains an energy consumption prediction model by using the received training sample. The first network device receives the energy consumption prediction model sent by the third network device. The local training sample includes historical traffic information, a historical energy consumption value, and a configuration parameter corresponding to the historical energy consumption value that are of a network device managed by the first network device. It should be noted that, the network device managed by the first network device may include the second network device, in other words, the local training sample may include historical traffic information, a historical energy consumption value, and a configuration parameter corresponding to the historical energy consumption value that are of the second network device. To be specific, in this implementation, the third network device trains the energy consumption prediction model by using the local training sample reported by the first network device, and sends the trained energy consumption prediction model to the first network device. The trained energy consumption prediction model may learn an association relationship between traffic information, a configuration parameter, and an energy consumption value, so that when the energy consumption of each energy saving policy is determined using the energy consumption prediction model, the second traffic information and a configuration parameter corresponding to the energy saving policy are input into the energy consumption prediction model, and an energy consumption value corresponding to the energy saving policy is determined using the energy consumption prediction model.

When the third network device corresponds to a plurality of first network devices, the third network device may receive local training samples respectively sent by the plurality of first network devices, to generate the energy consumption prediction model through training using the large quantity of local training samples, and improve prediction accuracy of the energy consumption prediction model.

In another manner, the first network device generates a first energy consumption prediction model through training using a local training sample, and sends a model parameter of the first energy consumption prediction model to the third network device, so that the third network device determines a second energy consumption prediction model based on model parameters that are of first energy consumption prediction models and that are respectively sent by a plurality of first network devices. The first network device receives the second energy consumption prediction model sent by the third network device, and uses the second energy consumption prediction model to predict the energy consumption of each energy saving policy. The local training sample includes historical traffic information, a historical energy consumption value, and a configuration parameter corresponding to the historical energy consumption value that are of a network device managed by the first network device. In the training manner, each of the plurality of first network devices managed by the third network device first generates the first energy consumption prediction model by using the local training sample, and sends the model parameter of the first energy consumption prediction model to the third network device. After receiving the model parameters respectively sent by the plurality of first network devices, the third network device determines a model parameter of an energy consumption prediction model based on the plurality of model parameters, to generate the energy consumption prediction model. That is, in this implementation, the third network device and the plurality of first network devices determine the energy consumption prediction model in a federated learning manner.

Network devices of a same device type correspond to one energy consumption prediction model, and network devices of different device types correspond to different energy consumption prediction models. For one energy consumption prediction model, the first network device or the third network device trains the energy consumption prediction model based on training samples from network devices of a same type. One training sample includes traffic information of traffic processed by one network device of the device type in a historical time period, an energy consumption value corresponding to the historical time period, and a configuration parameter corresponding to the historical time period. On this basis, before the first network device inputs, into the energy consumption prediction model, the second traffic information and the configuration parameter corresponding to the energy saving policy, the first network device determines, based on a device type of the second network device, an energy consumption prediction model corresponding to the device type, to predict, by using the energy consumption prediction model, energy consumption corresponding to the energy saving policy. That network devices are of a same type means, for example, the network devices are of a same model.

The energy consumption prediction model may be a regression prediction model, a neural network model, or the like. When the energy consumption prediction model is the neural network, a network device (the first network device or the third network device) obtains a local training sample, each local training sample includes traffic information of traffic processed by one network device in a historical time period, an energy consumption value corresponding to the historical time period, and a configuration parameter corresponding to the historical time period, where the energy consumption value is used as a label. In a process of each round of iterative training, the network device may input, into the neural network model, traffic information and a configuration parameter that are in a training sample, and the neural network model outputs an inference result (an energy consumption value) for the training sample. Then, the network device may calculate, based on a corresponding loss function, a loss value between the inference result output by the neural network model and an actual result (label) of the training sample. Then, the network device may calculate a change gradient of a parameter at each network layer in the neural network model based on the calculated loss value. In this way, the network device may calculate an adjustment value (which may also be referred to as a parameter update amount) of the parameter in the process of the round of iterative training based on a hyperparameter preset in an optimizer and the change gradient of the parameter at each network layer. The adjustment value may be, for example, a product of the change gradient and the hyperparameter (for example, a learning rate), so that the network device can update a parameter value of the parameter based on a calculated adjustment value of each parameter. After a plurality of times of the foregoing training, when the loss value is less than a preset threshold, the training is stopped, and the energy consumption prediction model is obtained.

The first network device may be a controller, and the third network device is a cloud device. The controller and the cloud device may be integrated into a same hardware device, or may be two independent hardware devices, or may be two independent virtual devices.

Operation S104: The first network device determines, as a target energy saving policy, an energy saving policy corresponding to energy consumption that meets a preset condition.

After determining the energy consumption corresponding to each of the plurality of the energy saving policies, the first network device determines, as the target energy saving policy, the energy saving policy corresponding to the energy consumption that meets the preset condition. The preset condition may be set based on an actual application situation, for example, an energy consumption value is less than a preset energy consumption threshold, or the energy consumption value is the smallest. The determined target energy saving policy may include one or more energy saving policies. The first network device may divide the second time period into a plurality of sub time periods, and separately determine corresponding energy saving policies for the plurality of sub time periods. In this case, the target energy saving policy includes a plurality of energy saving policies. For example, the second time period is from 01:00 to 07:00, and one sub time period is obtained by dividing the second time period every two hours. In this case, a time period from 01:00 to 03:00 corresponds to an energy saving policy 1, a time period from 03:00 to 05:00 corresponds to an energy saving policy 2, and a time period from 05:00 to 07:00 corresponds to an energy saving policy 3. Then, the target energy saving policy includes the energy saving policy 1, the energy saving policy 2, and the energy saving policy 3. Alternatively, the first network device may determine energy saving policies for a plurality of second time periods, that is, determine one target energy saving policy for each second time period. For example, a time period from 01:00 to 07:00 is a $1^{st}$ second time period, a time period from 07:00 to 13:00 is a $2^{nd}$ second time period, and a time period from 13:00 to 19:00 is a $3^{rd}$ second time period. The first network device separately determines energy saving policies for the three second time periods. In this case, the target energy saving policy may include the three energy saving policies.

Operation S105: The first network device sends the target energy saving policy to the second network device.

The first network device and the second network device may agree on an execution time period of the target energy saving policy. For example, the first network device and the second network device agree on applying the energy saving policy at a next hour after receiving the energy saving policy. For example, if the second network device receives the energy saving policy at 13:30, the second network device applies the energy saving policy at 14:00.

In an embodiment, the first network device may further determine, based on the second traffic information and the target energy saving policy, a planned execution time period corresponding to the target energy saving policy. For example, when the target energy saving policy includes only one energy saving policy, the first network device determines, as the execution time period of the target energy saving policy, a time period corresponding to the second traffic information. When the target energy saving policy includes a plurality of energy saving policies, the first network device determines, as an execution time period of the corresponding energy saving policy, a time period corresponding to traffic information corresponding to each energy saving policy in the target energy saving policy. The first network device sends the planned execution time period to the second network device, so that the second network device executes the target energy saving policy in a time period corresponding to the planned execution time period. The planned execution time period may include a start time point and an end time point at which the second network device executes the target energy saving policy, or the planned execution time period may include information such as the start time point and execution duration. The start time point indicates a time point at which the second network device starts to execute the target energy saving policy, the end time point indicates a time point at which the second network device stops executing the target energy saving policy, and the start time point is earlier than the end time point.

Operation S106: The second network device receives the target energy saving policy, and applies a configuration parameter corresponding to the target energy saving policy.

After the first network device determines the target energy saving policy, the first network device sends the target energy saving policy to the second network device, so that the second network device applies the configuration parameter corresponding to the target energy saving policy.

When receiving the target energy saving policy, the second network device may apply, based on a preset configured energy saving time period, the configuration parameter corresponding to the target energy saving policy. Alternatively, the second network device may apply, based on the planned execution time period sent by the first network device, the configuration parameter corresponding to the target energy saving policy, and does not apply the target energy saving policy in a time period other than the planned execution time period. The first network device may send the target energy saving policy and the planned execution time period by using a same message, or may send the target energy saving policy and the planned execution time period by using different messages.

In addition, the first network device may further determine a wakeup value based on the target energy saving policy. The wakeup value indicates a condition under which the second network device stops executing the target energy saving policy. The wakeup value may be a traffic threshold. When the traffic processed by the second network device exceeds the traffic threshold, execution of the target energy saving policy is stopped. Alternatively, the wakeup value may be a performance threshold, such as, a delay threshold, a jitter threshold, or a packet loss rate threshold. When a performance value of executing the target energy saving policy by the second network device exceeds the performance threshold, the execution of the target energy saving policy is stopped. The traffic threshold may be a threshold corresponding to each interface in the second network device, or may be a threshold of the entire second network device. The performance threshold may also be a threshold of each interface in the second network device, or may be a threshold of the entire second network device.

During specific implementation, after determining the target energy saving policy, the first network device may calculate, based on the configuration parameter corresponding to the target energy saving policy, the wakeup value corresponding to the target energy saving policy. For example, if the second network device includes eight ports, and the target energy saving policy indicates to disable a port 1, a port 3, and a port 4, the first network device calculates a throughput threshold based on transmission bandwidth of remaining ports. Alternatively, an association relationship between each energy saving policy and a wakeup value corresponding to the energy saving policy is preconfigured, and after the target energy saving policy is determined, a matched wakeup value is determined based on the foregoing association relationship.

In some application scenarios, when the second network device executes the target energy saving policy, traffic abnormality may occur, so that a statistical value of the second network device exceeds the wakeup value. In this case, the second network device stops executing the target energy saving policy in advance. In addition, the second network device may send an actual execution time period of the target energy saving policy to the first network device, and execution duration corresponding to the actual execution time period is less than execution duration corresponding to the planned execution time period. After stopping executing the target energy saving policy in advance, the second network device may continue to be run based on configuration parameters of components before the target energy saving policy is executed, or continue to be run based on pre-stored default configuration parameters.

After receiving the actual execution time period sent by the second network device, the first network device may update the target energy saving policy based on the actual execution time period. Updating the target energy saving policy may include that updating the configuration parameter corresponding to the target energy saving policy. For example, in the energy saving policy before the update, a CPU frequency is reduced by 50%, and the CPU frequency is reduced to 45% after the update; the energy saving policy before the update is to disable a specific port, disable a specific switching board, and disable a specific CPU core; and the energy saving policy after the update is to disable a specific port and disable a specific switching board.

In addition, the second network device may further send third traffic information to the first network device, where a traffic value corresponding to the third traffic information exceeds the wakeup value. The first network device optimizes the traffic prediction model based on the third traffic information, so that a prediction result of the traffic prediction model is more accurate. The third traffic information may include a statistical value such as a time sequence indicating a traffic size, a traffic average value, or a traffic variance.

In an application scenario, the first network device may not send the wakeup value to the second network device. Instead, when executing the target energy saving policy, the second network device determines, based on a current transmission performance value, whether the execution of the target energy saving policy needs to be stopped. Specifically, when the second network device executes the target energy saving policy, the second network device determines the transmission performance value; and when the transmission performance value is greater than a transmission performance threshold, the second network device stops executing the target energy saving policy. The transmission performance value may reflect transmission quality of the second network device, and may include a transmission delay, a packet loss rate, and the like. For example, when the transmission delay of the second network device is greater than a delay threshold, the second network device stops executing the target energy saving policy. For another example, when the packet loss rate of the second network device is greater than a packet loss rate threshold, the second network device stops executing the target energy saving policy. For another example, when the packet loss rate of the second network device is greater than a preset packet loss rate threshold and the transmission delay is also greater than a preset delay threshold, the second network device stops executing the target energy saving policy. After stopping executing the target energy saving policy, the second network device sends the actual execution time period of the target energy saving policy to the first network device, so that the first network device can learn that the target energy saving policy is stopped in advance. The second network device may further send the third traffic information to the first network device, where the third traffic information indicates traffic that triggers stop of the target energy saving policy, so that the first network device optimizes the traffic prediction model based on the third traffic information.

It can be learned that the second network device may report, to the first network device, the traffic information, that is, the first traffic information of the traffic processed by the second network device in the first time period. After receiving the first traffic information, the first network device predicts, based on the first traffic information, the second traffic information corresponding to the second network device in the second time period. The second time period is later than the first time period. After predicting the second traffic information, the first network device determines, based on the second traffic information, energy consumption corresponding to each of a plurality of energy saving policies. Each energy saving policy includes a configuration parameter corresponding to the component in the second network device when the component in the second network device is run based on the energy saving policy. After determining the energy consumption corresponding to each energy saving policy, the first network device determines, as the target energy saving policy, the energy saving policy corresponding to the energy consumption that meets the preset condition, and sends the target energy saving policy to the second network device, to enable the second network device to be run based on the configuration parameter in the target energy saving policy. To be specific, the first network device determines, by predicting the second traffic information of the traffic processed by the second network device in the second time period, the target energy saving policy that matches the traffic information, and sends the target energy saving policy to the second network device, so that the second network device configures a parameter of an internal component based on the target energy saving policy that matches the to-be-processed traffic. Therefore, the second network device does not need to always maintain a high configuration, but can flexibly apply a configuration matching the to-be-processed traffic, to reduce energy consumption in a low-traffic time period.

FIG. 2 is a schematic diagram of an application scenario according to an embodiment of this application. Refer to the schematic diagram of the application scenario shown in FIG. 2. The application scenario includes a cloud device, an analyzer, a controller, and a network device. The cloud device may be deployed on the public cloud, edge cloud, or distributed cloud. The network device may include a forwarding device and a terminal device in a network. The controller may collect data from the network device and send the data to the analyzer, so that the analyzer predicts, based on the collected data, traffic information of traffic processed by the network device, and further determines an energy saving policy and a time period for executing the energy saving policy. The analyzer sends the determined energy saving policy and the corresponding execution time period to the network device through the controller, and the network device applies a configuration parameter corresponding to the energy saving policy, to reduce energy consumption of the network device.

In the application scenario shown in FIG. 2, the controller may collect a training sample, and send the training sample to the cloud device through the analyzer, and the cloud device trains an energy consumption prediction model by using the training sample. One training sample includes traffic information of one network device in a historical time period, an energy consumption value corresponding to the historical time period, and a configuration parameter corresponding to the historical time period. The cloud device generates, based on a plurality of training samples of network devices of a same device type, an energy consumption prediction model for the device type through training, and sends the energy consumption prediction model to the analyzer. In an actual application process, the controller collects first traffic information corresponding to the network device in a first time period, and sends the first traffic information to the analyzer, and the analyzer obtains, by using the first traffic information and a traffic prediction model, second traffic information corresponding to the network device in a second time period. The analyzer inputs, into the energy consumption prediction model, the second traffic information and a configuration parameter corresponding to one energy saving policy, determines energy consumption corresponding to the energy saving policy, and determines, as a target energy saving policy, an energy saving policy corresponding to energy consumption that meets a preset condition. In addition, the analyzer may further determine a planned execution time period and a wakeup value that correspond to the target energy saving policy, and send the target energy saving policy, the planned execution time period, and the wakeup value to the network device. A policy execution module in the network device executes the target energy saving policy based on the planned execution time period, to reduce the energy consumption. In a process of executing the target energy saving policy, a wakeup detection module in the network device is configured to determine whether traffic currently processed by the network device is greater than the wakeup value, and if the traffic currently processed by the network device is greater than the wakeup value, send an abnormal message to the policy execution module, so that the policy execution module stops executing the target energy saving policy. The network device may further send an actual execution time period and abnormal traffic information to the analyzer through the controller, so that the analyzer can update the energy saving policy, the traffic prediction model, and the like based on the actual execution time period and the abnormal traffic information.

The analyzer and the controller may be a same physical device, or may be two independent physical devices. Alternatively, the analyzer and the cloud device may be a same physical device, or may be two independent physical devices. During actual application, the cloud device may collect training samples sent by a plurality of analyzers, to train the energy consumption prediction model by using the large quantity of training samples, to improve prediction accuracy of the energy consumption prediction model.

Based on the foregoing method embodiments, an embodiment of this application further provides an apparatus for adjusting a running status of a network device. The following is described with reference to the accompanying drawings.

Figure 3:
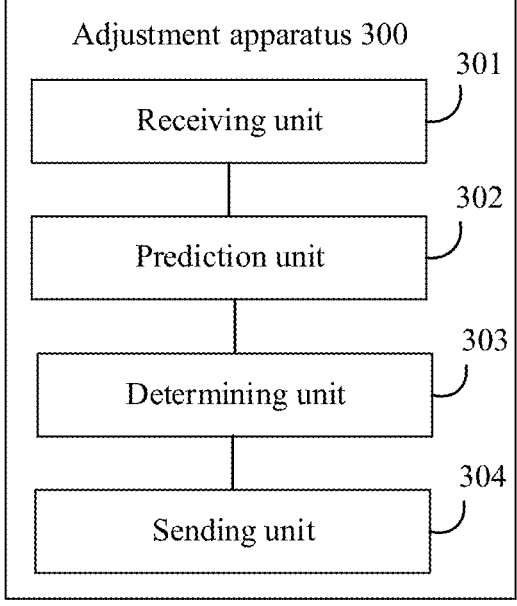
FIG. 3 is a schematic diagram of a structure of an apparatus for adjusting a running status of a network device according to an embodiment of this application.

Refer to FIG. 3. FIG. 3 is a schematic diagram of a structure of an apparatus 300 for adjusting a running status of a network device according to an embodiment of this application. The apparatus 300 may be configured to implement a function of the foregoing first network device. As shown in FIG. 3, the apparatus 300 includes a receiving unit 301, a prediction unit 302, a determining unit 303, and a sending unit 304.

The receiving unit 301 is configured to receive first traffic information sent by a second network device. The first traffic information indicates a value of traffic processed by the second network device in a first time period.

The prediction unit 302 is configured to predict, based on the first traffic information, second traffic information corresponding to the second network device in a second time period. The second time period is later than the first time period.

The determining unit 303 is configured to determine, based on the second traffic information, an energy consumption value corresponding to each of a plurality of energy saving policies. Each energy saving policy includes a configuration parameter corresponding to a component in the second network device when the component in the second network device is run based on the energy saving policy.

The determining unit 303 is further configured to determine, as a target energy saving policy, an energy saving policy corresponding to an energy consumption value that meets a preset condition.

The sending unit 304 is configured to send the target energy saving policy to the second network device, so that the second network device is run based on a configuration parameter in the target energy saving policy.

In an embodiment, the determining unit 303 is further configured to determine, based on the second traffic information and the target energy saving policy, a planned execution time period corresponding to the target energy saving policy. The sending unit 304 is further configured to send the planned execution time period to the second network device, so that the second network device executes the target energy saving policy in a time period corresponding to the planned execution time period.

In an embodiment, the determining unit 303 is further configured to determine a wakeup value based on the target energy saving policy. The wakeup value indicates a condition under which the second network device stops executing the target energy saving policy. The sending unit 304 is further configured to send the wakeup value to the second network device.

In an embodiment, the prediction unit 302 is configured to input the first traffic information into a traffic prediction model, to obtain the second traffic information output by the traffic prediction model. The traffic prediction model is generated through training based on historical traffic information of the second network device.

In an embodiment, the determining unit 303 is configured to: for each energy saving policy, input, into an energy consumption prediction model, the second traffic information and a configuration parameter corresponding to the energy saving policy, to obtain energy consumption that is output by the energy consumption prediction model and that corresponds to the energy saving policy. The energy consumption prediction model is generated based on training samples. Each training sample includes traffic information of a network device in a historical time period, an energy consumption value of the network device in the historical time period, and a configuration parameter of the network device in the historical time period. The network device is the second network device, or a network device of a same device type as the second network device.

In an embodiment, the determining unit 303 is further configured to: before inputting, into the energy consumption prediction model, the second traffic information and the configuration parameter corresponding to the energy saving policy, determine the energy consumption prediction model based on a device type of the second network device. The device type corresponds to the energy consumption prediction model.

In an embodiment, the apparatus 300 further includes an update unit. The receiving unit 301 is further configured to receive an actual execution time period that is of the target energy saving policy and that is sent by the second network device. Execution duration corresponding to the actual execution time period is less than execution duration corresponding to the planned execution time period of the target energy saving policy. The update unit is configured to update the target energy saving policy based on the actual execution time period.

In an embodiment, the apparatus 300 further includes an optimization unit. The receiving unit 301 is further configured to receive third traffic information sent by the second network device. A statistical value corresponding to the third traffic information exceeds the wakeup value. The optimization unit is configured to optimize the traffic prediction model based on the third traffic information.

In an embodiment, the sending unit 304 is further configured to send a training sample to a third network device. One training sample includes traffic information of one network device managed by the first network device in one historical time period, an energy consumption value of the network device in the historical time period, and a configuration parameter of the network device in the historical time period. The receiving unit 301 is further configured to receive an energy consumption prediction model sent by the third network device. The energy consumption prediction model is generated by the third network device through training using the training sample.

In an embodiment, the apparatus 300 further includes a generation unit. The generation unit is configured to generate a first energy consumption prediction model by using the training sample. The sending unit 304 is further configured to send a model parameter of the first energy consumption prediction model to the third network device. The receiving unit 301 is further configured to receive the energy consumption prediction model sent by the third network device. The energy consumption prediction model is determined by the third network device based on model parameters that are of first energy consumption prediction models and that are respectively sent by a plurality of first network devices.

In an embodiment, the preset condition includes that the energy consumption value corresponding to the target energy saving policy is a smallest value of a plurality of energy consumption values corresponding to the plurality of energy saving policies, or the energy consumption value corresponding to the target energy saving policy is less than or equal to an energy consumption threshold.

It should be noted that, for implementation of each unit in this embodiment, reference may be made to related descriptions in the foregoing method embodiments, and details are not described herein in this embodiment.

Figure 4:
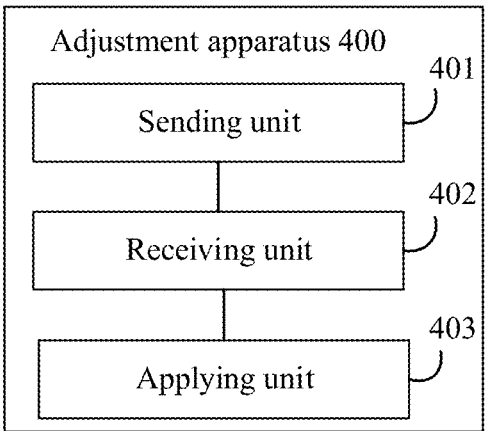
FIG. 4 is a schematic diagram of a structure of another apparatus for adjusting a running status of a network device according to an embodiment of this application.

Refer to FIG. 4. FIG. 4 is a schematic diagram of a structure of an apparatus 400 for adjusting a running status of a network device according to an embodiment of this application. The apparatus 400 may be configured to implement a function of the foregoing second network device. The apparatus 400 includes a sending unit 401, a receiving unit 402, and an applying unit 403.

The sending unit 401 is configured to send first traffic information to a first network device. The first traffic information indicates a value of traffic processed by the second network device in a first time period.

The receiving unit 402 is configured to receive a target energy saving policy sent by the first network device. The target energy saving policy is determined by the first network device based on second traffic information. The second traffic information is traffic that corresponds to the second network device in a second time period and that is predicted by the first network device based on the first traffic information. The second time period is later than the first time period. The target energy saving policy includes a configuration parameter corresponding to a component in the second network device when the component in the second network device is run based on the target energy saving policy. Energy consumption corresponding to the target energy saving policy meets a preset condition.

The applying unit 403 is configured to apply the configuration parameter corresponding to the target energy saving policy.

In an embodiment, the receiving unit 402 is further configured to receive a planned execution time period sent by the first network device. The planned execution time period indicates an execution time period of the target energy saving policy. The planned execution time period is determined by the first network device based on the second traffic information and the target energy saving policy.

In an embodiment, the receiving unit 402 is further configured to receive a wakeup value sent by the first network device. The wakeup value indicates a condition under which the second network device stops executing the target energy saving policy. The wakeup value is determined by the first network device based on the target energy saving policy.

In an embodiment, the apparatus 400 further includes a stopping unit. The stopping unit is configured to stop executing the target energy saving policy when the second network device executes the target energy saving policy and a statistical value of the second network device exceeds the wakeup value.

In an embodiment, the apparatus 400 further includes a determining unit. The determining unit is configured to determine a transmission performance value when the second network device executes the target energy saving policy. The stopping unit is configured to stop executing the target energy saving policy when the transmission performance value is greater than a transmission performance threshold.

In an embodiment, the sending unit 401 is further configured to send an actual execution time period of the target energy saving policy to the first network device. Execution duration corresponding to the actual execution time period is less than execution duration corresponding to the planned execution time period.

In an embodiment, the sending unit 401 is further configured to send third traffic information to the first network device. The third traffic information indicates traffic that triggers stop of the target energy saving policy.

It should be noted that, for implementation of each unit in this embodiment, reference may be made to related descriptions in the foregoing method embodiments, and details are not described herein in this embodiment.

Figure 5:
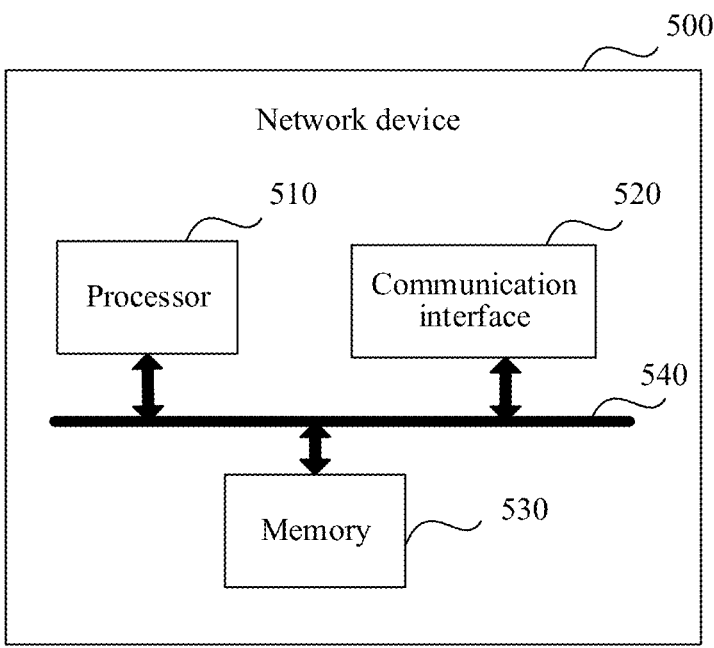
FIG. 5 is a schematic diagram of a structure of a network device according to an embodiment of this application.

FIG. 5 is a schematic diagram of a structure of a network device according to an embodiment of this application. The network device may be, for example, the first network device, the second network device, or the third network device in the foregoing method embodiments, or may be implemented by a device of the apparatus 300 in the embodiment shown in FIG. 3, or may be implemented by a device of the apparatus 400 in the embodiment shown in FIG. 4.

The network device 500 includes a processor 510, a communication interface 520, and a memory 530. There may be one or more processors 510 in the network device 500. In FIG. 5, one processor is used as an example. In this embodiment of this application, the processor 510, the communication interface 520, and the memory 530 may be connected using a bus system or in another manner. In FIG. 5, an example in which the processor 510, the communication interface 520, and the memory 530 are connected using a bus system 540 is used.

The processor 510 may be a CPU, a network processor (NP), or a combination of a CPU and an NP. The processor 510 may further include a hardware chip. The hardware chip may be an application-specific integrated circuit (ASIC), a programmable logic device (PLD), or a combination thereof. The PLD may be a complex programmable logic device (CPLD), a field programmable logic gate array (FPGA), generic array logic (GAL), or any combination thereof.

The memory 530 may include a volatile memory (volatile memory), for example, a random access memory (RAM). The memory 530 may alternatively include a non-volatile memory, for example, a flash memory, a hard disk drive (HDD), or a solid-state drive (SSD). The memory 530 may alternatively include a combination of the foregoing types of memories.

In an embodiment, the memory 530 stores an operating system and a program, an executable module, or a data structure, or a subset thereof, or an extended set thereof. The program may include various operation instructions, used to implement various operations. The operating system may include various system programs, used to implement various basic services and process hardware-based tasks. The processor 510 can read the program in the memory 530, to implement the method according to embodiments of this application.

The memory 530 may be a storage component in the network device 500, or may be a storage apparatus independent of the network device 500.

The bus system 540 may be a peripheral component interconnect (PCI) bus, an extended industry standard architecture (EISA) bus, or the like. The bus system 540 may be classified into an address bus, a data bus, a control bus, and the like. For ease of representation, only one thick line is used for representing the bus system in FIG. 5, but this does not mean that there is only one bus or only one type of bus.

Figure 6:
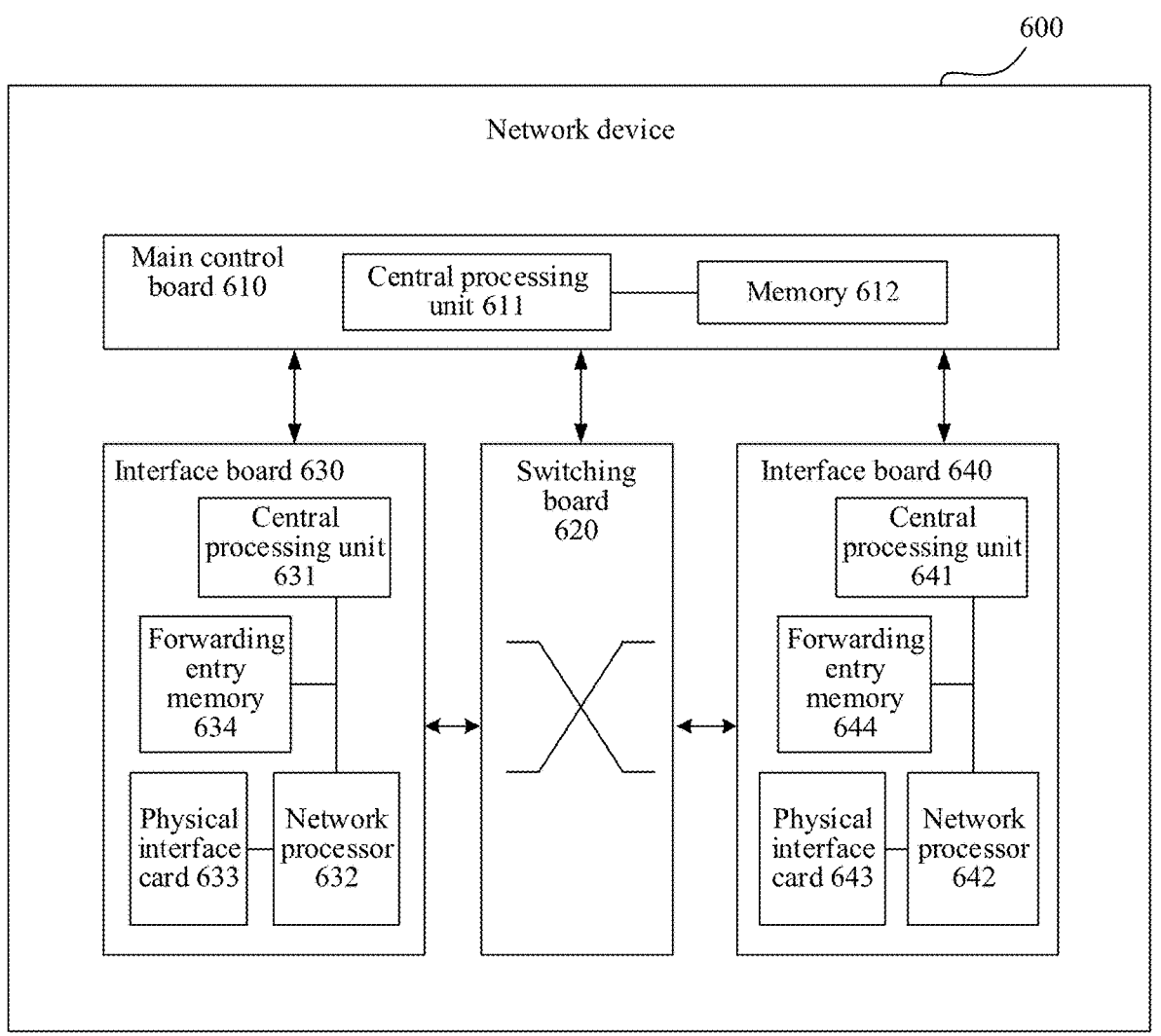
FIG. 6 is a schematic diagram of a structure of another network device according to an embodiment of this application.

FIG. 6 is a schematic diagram of a structure of a network device 600 according to an embodiment of this application. For example, the network device may be the first network device, the second network device, or the third network device in the method embodiments, or may be implemented by a device of the apparatus 300 in the embodiment in FIG. 3, or may be implemented by a device of the apparatus 400 in the embodiment in FIG. 4.

The network device 600 includes a main control board 610 and an interface board 630.

The main control board 610 is also referred to as a main processing unit (MPU) or a route processor card. The main control board 610 is configured to control and manage components in the network device 600, including route computation, device management, device maintenance, protocol processing, and the like. The main control board 610 includes a central processing unit 611 and a memory 612.

The interface board 630 is also referred to as a line processing unit (LPU), a line card, or a service board. The interface board 630 is configured to provide various service interfaces, and implement forwarding of a data packet. The service interface includes but is not limited to an Ethernet interface, a POS (Packet over SONET/SDH) interface, and the like. The Ethernet interface is, for example, an Ethernet interface, a gigabit Ethernet interface, or a flexible Ethernet service interface (FlexE Clients). The interface board 630 includes a central processing unit 631, a network processor 632, a forwarding entry memory 634, and a physical interface card (PIC) 633.

The central processing unit 631 on the interface board 630 is configured to control and manage the interface board 630 and communicate with the central processing unit 611 on the main control board 610.

The network processor 632 is configured to implement packet forwarding processing. A form of the network processor 632 may be a forwarding chip. Specifically, processing of an uplink packet includes processing at a packet ingress interface and forwarding table lookup; and processing of a downlink packet includes forwarding table lookup and the like.

The physical interface card 633 is configured to implement an interconnection function at a physical layer. Original traffic enters the interface board 630 from the physical interface card 633, and a processed packet is sent out from the physical interface card 633. The physical interface card 633 includes at least one physical interface, and the physical interface is also referred to as a physical port. The physical interface card 633 is also referred to as a subcard, may be mounted on the interface board 630, and is responsible for converting an optical/electrical signal into a packet, performing validity check on the packet, and forwarding the packet to the network processor 632 for processing. In some embodiments, the central processing unit 631 of the interface board 630 may also perform a function of the network processor 632, for example, implement software forwarding based on a general-purpose CPU. Therefore, the network processor 632 is not required in the physical interface card 633.

In an embodiment, the network device 600 includes a plurality of interface boards. For example, the network device 600 further includes an interface board 640. The interface board 640 includes a central processing unit 641, a network processor 642, a forwarding entry memory 644, and a physical interface card 643.

In an embodiment, the network device 600 further includes a switching board 620. The switching board 620 may also be referred to as a switch fabric unit (SFU). When the network device includes a plurality of interface boards 630, the switching board 620 is configured to complete data exchange between the interface boards. For example, the interface board 630 may communicate with the interface board 640 through the switching board 620.

The main control board 610 is coupled to the interface board 630. For example, the main control board 610, the interface board 630, the interface board 640, and the switching board 620 are connected to a system backplane through a system bus to implement interworking. In an embodiment, an inter-process communication (IPC) protocol channel is established between the main control board 610 and the interface board 630, and the main control board 610 communicates with the interface board 630 through the IPC channel.

Logically, the network device 600 includes a control plane and a forwarding plane. The control plane includes the main control board 610 and the central processing unit 631, and the forwarding plane includes components, such as the forwarding entry memory 634, the physical interface card 633, and the network processor 632, that perform forwarding. The control plane performs functions such as a function of a router, generating a forwarding table, processing signaling and protocol packets, and configuring and maintaining a status of a device. The control plane delivers the generated forwarding table to the forwarding plane. On the forwarding plane, the network processor 632 searches the forwarding table delivered by the control plane, to forward a packet received by the physical interface card 633. The forwarding table delivered by the control plane may be stored in the forwarding entry memory 634. In some embodiments, the control plane and the forwarding plane may be completely separated, and are not on a same device.

It should be understood that an operation on the interface board 640 is consistent with an operation on the interface board 630 in this embodiment of this application. For brevity, details are not described. It should be understood that the network device 600 in this embodiment may correspond to the network device in the foregoing method embodiments. The main control board 610, the interface board 630, and/or the interface board 640 in the network device 600 may implement various steps in the foregoing method embodiments. For brevity, details are not described herein.

It should be understood that there may be one or more main control boards. When there are a plurality of main control boards, the main control boards may include an active main control board and a standby main control board. There may be one or more interface boards, and a network device having a stronger data processing capability provides more interface boards. There may also be one or more physical interface cards on the interface board. There may be no switching board, or one or more switching boards. When there are a plurality of switching boards, load balancing and redundancy backup may be implemented together. In a centralized forwarding architecture, the network device may not need the switching board, and the interface board provides a function of processing service data of an entire system. In a distributed forwarding architecture, the network device may include at least one switching board, and data exchange between a plurality of interface boards is performed using the switching board, to provide a large-capacity data exchange and processing capability. Therefore, a data access and processing capability of the network device in the distributed architecture is better than a data access and processing capability of a device in the centralized architecture. In an embodiment, the network device may alternatively be in a form in which there is only one card. To be specific, there is no switching board, and functions of the interface board and the main control board are integrated on the card. In this case, the central processing unit on the interface board and the central processing unit on the main control board may be combined into one central processing unit on the card, to perform functions obtained after the two central processing units are combined. The device in this form (for example, a network device such as a low-end switch or router) has a weak data exchange and processing capability. A specific architecture to be used depends on a specific networking deployment scenario.

In some possible embodiments, the foregoing network device may be implemented as a virtualized device. For example, the virtualized device may be a virtual machine (VM) on which a program having a packet sending function is run, and the virtual machine is deployed on a hardware device (for example, a physical server). The virtual machine is a complete computer system simulated by software, having complete hardware system functions, and running in a completely isolated environment. The virtual machine may be configured as the network device. For example, the network device may be implemented based on a general-purpose physical server by using a network functions virtualization (NFV) technology. The network device is a virtual host, a virtual router, or a virtual switch. By reading this application, a person skilled in the art may obtain, on the general-purpose physical server through virtualization with reference to the NFV technology, the network device having the foregoing functions. Details are not described herein.

It should be understood that the network devices in the foregoing product types have any function of the network device in the foregoing method embodiments. Details are not described herein.

An embodiment of this application further provides a chip, including a processor and an interface circuit. The interface circuit is configured to receive instructions and send the instructions to the processor. The processor may be, for example, a specific implementation form of the adjustment apparatus 300 shown in FIG. 3, and may be configured to perform the foregoing method for adjusting a running status of a network device. The processor is coupled to a memory, and the memory is configured to store a program or instructions. When the program or the instructions are executed by the processor, the chip system is enabled to implement the method in any one of the foregoing method embodiments.

In an embodiment, there may be one or more processors in the chip system. The processor may be implemented by hardware or may be implemented by software. When the processor is implemented by hardware, the processor may be a logic circuit, an integrated circuit, or the like. When the processor is implemented by software, the processor may be a general-purpose processor, and is implemented by reading software code stored in the memory.

In an embodiment, there may be one or more memories in the chip system. The memory may be integrated with the processor, or may be disposed separately from the processor. This is not limited in this application. For example, the memory may be a non-transitory processor, for example, a read-only memory ROM. The memory and the processor may be integrated on a same chip, or may be separately disposed on different chips. A type of the memory and a manner of disposing the memory and the processor are not specifically limited in this application.

For example, the chip system may be, for example, an FPGA, an ASIC, a system on chip (SoC), a CPU, an NP, a digital signal processing circuit (DSP), a microcontroller (MCU), a PLD, or another integrated chip.

An embodiment of this application further provides a computer-readable storage medium, including instructions or a computer program. When the computer-readable storage medium is run on a computer, the computer is enabled to perform the method for adjusting a running status of a network device in the foregoing embodiments.

An embodiment of this application further provides a computer program product including instructions or a computer program. When the computer program product runs on a computer, the computer is enabled to perform the method for adjusting a running status of a network device in the foregoing embodiments.

In the specification, claims, and accompanying drawings of this application, the terms "first", "second", "third", "fourth", and the like (if existent) are used for distinguishing between similar objects but do not necessarily indicate a specific order or sequence. It should be understood that the data used in such a way is interchangeable in a proper circumstance, so that embodiments described herein can be implemented in other orders than the order illustrated or described herein. In addition, the terms "include", "have" and any other variants thereof mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device.

It may be clearly understood by a person skilled in the art that, for convenient and brief description, for a detailed working process of the foregoing system, apparatus, and unit, reference may be made to a corresponding process in the foregoing method embodiments, and details are not described herein again.

In the several embodiments provided in this application, it should be understood that, the disclosed system, apparatus, and method may be implemented in another manner. For example, the described apparatus embodiment is merely an example. For example, division into the units is merely logical service division and may be other division during actual implementation. For example, a plurality of units or components may be combined or integrated into another system, or some features may be ignored or not performed. In addition, the displayed or discussed mutual couplings or direct couplings or communication connections may be implemented using some interfaces. Indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. A part or all of the units may be selected based on an actual requirement to achieve the objectives of the solutions of embodiments.

In addition, all service units in embodiments of this application may be integrated into one processing unit, or each of the units may exist alone physically, or two or more units are integrated into one unit. The integrated unit may be implemented in a form of hardware, or may be implemented in a form of a software service unit.

When the integrated unit is implemented in the form of a software service unit and sold or used as an independent product, the integrated unit may be stored in one computer-readable storage medium. Based on such an understanding, the technical solutions of this application essentially, or the part contributing to the conventional technology, or all or a part of the technical solutions may be implemented in a form of a software product. The computer software product is stored in a storage medium and includes several instructions for instructing a computer device (which may be a personal computer, a server, a network device, or the like) to perform all or a part of the steps of the method in embodiments of this application. The foregoing storage medium includes any medium, for example, a USB flash drive, a removable hard disk, a ROM, a RAM, a magnetic disk, or an optical disc that can store program code.

A person skilled in the art should be aware that, in the foregoing one or more examples, the services described in this application may be implemented by hardware, software, firmware, or any combination thereof. When the services are implemented by software, the services may be stored in a computer-readable medium or transmitted as one or more instructions or code in a computer-readable medium. The computer-readable medium includes a computer storage medium and a communication medium, where the communication medium includes any medium that enables a computer program to be transmitted from one place to another. The storage medium may be any available medium accessible to a general-purpose or dedicated computer.

In the foregoing specific implementations, the objectives, technical solutions, and beneficial effects of this application are further described in detail. It should be understood that the foregoing descriptions are merely specific implementations of this application.

The foregoing embodiments are merely intended to describe the technical solutions of this application, but not to limit this application. Although this application is described in detail with reference to the foregoing embodiments, a person of ordinary skill in the art should understand that modifications may still be made to the technical solutions described in the foregoing embodiments or equivalent replacements may be made to some technical features thereof, without departing from the scope of the technical solutions of embodiments of this application.

What is claimed is:

1. A method for adjusting a running status of a network device, wherein the method comprises:

receiving, by a first network device, first traffic information sent by a second network device, wherein the first traffic information indicates a value of traffic processed by the second network device in a first time period;

predicting, by the first network device based on the first traffic information, second traffic information corresponding to the second network device in a second time period, wherein the second time period is later than the first time period;

determining, by the first network device based on the second traffic information, an energy consumption value corresponding to each of a plurality of energy saving policies, wherein each energy saving policy comprises a configuration parameter corresponding to a component in the second network device when the component in the second network device is run based on the energy saving policy; and determining, by the first network device as a target energy saving policy, an energy saving policy corresponding to an energy consumption value that meets a preset condition, and sending the target energy saving policy to the second network device, to enable the second network device to be run based on a configuration parameter in the target energy saving policy.

2. The method according to claim 1, wherein the method further comprises:

determining, by the first network device based on the second traffic information and the target energy saving policy, a planned execution time period corresponding to the target energy saving policy; and sending, by the first network device, the planned execution time period to the second network device, to enable the second network device to execute the target energy saving policy in a time period corresponding to the planned execution time period.

3. The method according to claim 1, wherein the method further comprises:

determining, by the first network device, a wakeup value based on the target energy saving policy, wherein the wakeup value indicates a condition under which the second network device stops executing the target energy saving policy; and sending, by the first network device, the wakeup value to the second network device.

4. The method according to claim 1, wherein the predicting, by the first network device based on the first traffic information, second traffic information corresponding to the second network device in a second time period comprises:

inputting, by the first network device, the first traffic information into a traffic prediction model, to obtain the second traffic information output by the traffic prediction model, wherein the traffic prediction model is generated through training based on historical traffic information of the second network device.

5. The method according to claim 1, wherein the determining, by the first network device based on the second traffic information, an energy consumption value corresponding to each of a plurality of energy saving policies comprises:

for each energy saving policy, inputting, by the first network device, the second traffic information and the energy saving policy into an energy consumption prediction model, to obtain an energy consumption value that is output by the energy consumption prediction model and that corresponds to the energy saving policy, wherein the energy consumption prediction model is generated based on training samples, and each training sample comprises traffic information, an energy consumption value, and a configuration parameter corresponding to the energy consumption value.

6. The method according to claim 5, further comprising:

before the inputting, by the first network device, the second traffic information and the energy saving policy into an energy consumption prediction model, determining, by the first network device, the energy consumption prediction model based on a device type of the second network device, wherein the device type corresponds to the energy consumption prediction model.

7. The method according to claim 2, wherein the method further comprises:

receiving, by the first network device, an actual execution time period that is of the target energy saving policy and that is sent by the second network device, wherein execution duration corresponding to the actual execution time period is less than execution duration corresponding to the planned execution time period; and updating, by the first network device, the target energy saving policy based on the actual execution time period.

8. The method according to claim 4, wherein the method further comprises:

receiving, by the first network device, third traffic information sent by the second network device, wherein a statistical value corresponding to the third traffic information exceeds a wakeup value; and optimizing, by the first network device, the traffic prediction model based on the third traffic information.

9. The method according to claim 5, wherein the method further comprises:

sending, by the first network device, a local training sample to a third network device, wherein the local training sample comprises historical traffic information, a historical energy consumption value, and a configuration parameter corresponding to the historical energy consumption value that are of a network device managed by the first network device; and receiving, by the first network device, the energy consumption prediction model sent by the third network device, wherein the energy consumption prediction model is generated by the third network device through training using the local training sample.

10. The method according to claim 5, wherein the method further comprises:

generating, by the first network device, a first energy consumption prediction model by using a local training sample, and sending a model parameter of the first energy consumption prediction model to a third network device, wherein the local training sample comprises historical traffic information, a historical energy consumption value, and a configuration parameter corresponding to the historical energy consumption value that are of a network device managed by the first network device; and receiving, by the first network device, the energy consumption prediction model sent by the third network device, wherein the energy consumption prediction model is determined by the third network device based on model parameters that are of first energy consumption prediction models and that are respectively sent by a plurality of first network devices.

11. The method according to claim 1, wherein the preset condition comprises that the energy consumption value corresponding to the target energy saving policy is a smallest value of a plurality of energy consumption values corresponding to the plurality of energy saving policies, or the energy consumption value corresponding to the target energy saving policy is less than or equal to an energy consumption threshold.

12. A method for adjusting a running status of a network device, wherein the method comprises:

sending, by a second network device, first traffic information to a first network device, wherein the first traffic information indicates a value of traffic processed by the second network device in a first time period;

receiving, by the second network device, a target energy saving policy sent by the first network device, wherein the target energy saving policy is determined by the first network device based on second traffic information, the second traffic information is traffic that corresponds to the second network device in a second time period and that is predicted by the first network device based on the first traffic information, the second time period is later than the first time period, the target energy saving policy comprises a configuration parameter corresponding to a component in the second network device when the component in the second network device is run based on the target energy saving policy, and energy consumption corresponding to the target energy saving policy meets a preset condition; and applying, by the second network device, the configuration parameter corresponding to the target energy saving policy.

13. The method according to claim 12, wherein the method further comprises:

receiving, by the second network device, a planned execution time period sent by the first network device, wherein the planned execution time period indicates an execution time period of the target energy saving policy, and the planned execution time period is determined by the first network device based on the second traffic information and the target energy saving policy.

14. The method according to claim 12, wherein the method further comprises:

receiving, by the second network device, a wakeup value sent by the first network device, wherein the wakeup value indicates a condition under which the second network device stops executing the target energy saving policy, and the wakeup value is determined by the first network device based on the target energy saving policy.

15. The method according to claim 14, wherein the method further comprises:

stopping, by the second network device, executing the target energy saving policy when the second network device executes the target energy saving policy and a statistical value of the second network device exceeds the wakeup value.

16. The method according to claim 12, wherein the method further comprises:

determining, by the second network device, a transmission performance value when the second network device executes the target energy saving policy; and stopping, by the second network device, executing the target energy saving policy when the transmission performance value is greater than a transmission performance threshold.

17. The method according to claim 15, wherein the method further comprises:

sending, by the second network device, an actual execution time period of the target energy saving policy to the first network device, wherein execution duration corresponding to the actual execution time period is less than execution duration corresponding to a planned execution time period.

18. The method according to claim 15, wherein the method further comprises:

sending, by the second network device, third traffic information to the first network device, wherein the third traffic information indicates traffic that triggers stop of the target energy saving policy.

19. An apparatus for adjusting a running status of a network device, wherein the apparatus is used in a first network device and comprises:

at least one processor; and a memory, coupled to the at least one processor and configured to store instructions that when executed by the at least one processor cause the apparatus to:

receive first traffic information sent by a second network device, wherein the first traffic information indicates a value of traffic processed by the second network device in a first time period;

predict, based on the first traffic information, second traffic information corresponding to the second network device in a second time period, wherein the second time period is later than the first time period;

determine, based on the second traffic information, an energy consumption value corresponding to each of a plurality of energy saving policies, wherein each energy saving policy comprises a configuration parameter corresponding to a component in the second network device when the component in the second network device is run based on the energy saving policy, and determine, as a target energy saving policy, an energy saving policy corresponding to an energy consumption value that meets a preset condition; and send the target energy saving policy to the second network device, to enable the second network device to be run based on a configuration parameter in the target energy saving policy.

20. An apparatus for adjusting a running status of a network device, wherein the apparatus is used in a second network device and comprises:

at least one processor; and a memory, coupled to the at least one processor and configured to store instructions that when executed by the at least one processor cause the apparatus to:

send first traffic information to a first network device, wherein the first traffic information indicates a value of traffic processed by the second network device in a first time period;

receive a target energy saving policy sent by the first network device, wherein the target energy saving policy is determined by the first network device based on second traffic information, the second traffic information is traffic that corresponds to the second network device in a second time period and that is predicted by the first network device based on the first traffic information, the second time period is later than the first time period, the target energy saving policy comprises a configuration parameter corresponding to a component in the second network device when the component in the second network device is run based on the target energy saving policy, and energy consumption corresponding to the target energy saving policy meets a preset condition; and apply the configuration parameter corresponding to the target energy saving policy.

* * * * *